US012719567B2

(12) United States Patent
Eslitzbichler et al.

(10) Patent No.: US 12,719,567 B2
(45) Date of Patent: Aug. 25, 2026

(54) SYSTEM AND METHOD FOR HANDLING TIMING IN A SATELLITE COMMUNICATION SYSTEM

(71) Applicant: Kratos Integral Holdings LLC, San Diego, CA (US)

(72) Inventors: Markus Eslitzbichler, Drammen (NO); Matthew Stoltenberg, Monument, CO (US); Petter Amundsen, Oslo (NO)

(73) Assignee: KRATOS INTEGRAL HOLDINGS LLC., San Diego, CA (US)

( * ) Notice: Subject to any disclaimer, the term of this patent is extended or adjusted under 35 U.S.C. 154(b) by 283 days.

(21) Appl. No.: 18/651,102

(22) Filed: Apr. 30, 2024

(65) Prior Publication Data

US 2025/0337485 A1 Oct. 30, 2025

(51) Int. Cl.
*H04B 7/185* (2006.01)

(52) U.S. Cl.
CPC ..... *H04B 7/18539* (2013.01); *H04B 7/18532* (2013.01); *H04B 7/18558* (2013.01)

(58) Field of Classification Search
CPC ............ H04B 7/18539; H04B 7/18532; H04B 7/18558
USPC .......................................................... 370/316
See application file for complete search history.

(56) References Cited

U.S. PATENT DOCUMENTS 10,826,599 B1 * 11/2020 Roy ..................... H04B 7/2125
2019/0312768 A1 * 10/2019 Yaghmour ............ H04W 88/16
2020/0028581 A1 * 1/2020 Gaske ................ H04B 7/18563
2023/0188142 A1 6/2023 Jarriel et al.
2023/0299843 A1 9/2023 Boyd et al.
2023/0412262 A1 12/2023 Border
2024/0418866 A1 * 12/2024 O'Connor ............. G01S 19/243

FOREIGN PATENT DOCUMENTS

WO WO-2020065043 A1 * 4/2020 ......... H04B 7/18517

OTHER PUBLICATIONS

International Application No. PCT/US2025/025573, "International Search Report and Written Opinion", Aug. 8, 2025, 12 pages.

* cited by examiner

*Primary Examiner* — Thai Q Tran
(74) *Attorney, Agent, or Firm* — Kilpatrick Townsend & Stockton LLP

(57) ABSTRACT

Described herein are systems, methods, and other techniques for handling timing in a satellite communication system having a gateway and a terminal. PDUs to be transmitted are received at the gateway. A traffic adapter computes a release time at which a baseband frame containing the PDUs is to be released. The traffic adapter generates the baseband frame containing the PDUs and a timing packet including a reference time. The traffic adapter tags the release time to the baseband frame. A virtual transmitter modulates the baseband frame, generates a digital IF packet containing the modulated baseband frame, and inserts the release time into a header of the digital IF packet. A digitizer releases the modulated baseband frame at the release time for transmission to the terminal via a satellite.

20 Claims, 9 Drawing Sheets

SYSTEM AND METHOD FOR HANDLING TIMING IN A SATELLITE COMMUNICATION SYSTEM

BACKGROUND OF THE INVENTION

Satellite communication systems play a crucial role in facilitating global connectivity across diverse applications, including telecommunications, broadcasting, internet services, and remote sensing. These systems operate by transmitting signals between ground-based Earth stations and satellites in orbit. The efficiency and reliability of such systems are important to addressing the increasing demands of contemporary communication and data services. Presently, communications engineers encounter numerous challenges, with a key concern being the optimization of information transmission over limited resources. Given the scarcity of available frequencies for radio signal communication and the rapid growth in the volume of information to be conveyed, there is a need to maximize the efficiency of available frequencies through the use of new hardware and software solutions at the ground stations, terminals, and satellites that make up such communication systems.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of handling timing in a satellite communication system having a gateway and a terminal, the method comprising: receiving, at the gateway, protocol data units (PDUs) to be transmitted to the terminal via a satellite; computing, by a traffic adapter of the gateway, a release time at which a baseband frame containing the PDUs is to be released from a digitizer of the gateway for transmission to the terminal via the satellite, the release time being computed based on a transmission and processing delay between the traffic adapter of the gateway and the digitizer of the gateway; generating, by the traffic adapter of the gateway, the baseband frame containing the PDUs and a timing packet, the timing packet including a reference time for use at the terminal for synchronizing a terminal clock with a gateway clock; tagging, by the traffic adapter of the gateway, the release time to the baseband frame to produce a tagged baseband frame; generating a digital intermediate frequency (IF) packet containing a modulated baseband frame and the release time by: modulating the baseband frame; and inserting the release time from the tagged baseband frame into a header of the digital IF packet; and releasing, by the digitizer of the gateway, the modulated baseband frame at the release time for transmission to the terminal via the satellite.

Example 2 is the method of example(s) 1, wherein the digital IF packet is generated by a virtual transmitter of the gateway, and wherein the method further comprises: sending the tagged baseband frame from the traffic adapter of the gateway to the virtual transmitter; and sending the digital IF packet from the virtual transmitter to the digitizer of the gateway.

Example 3 is the method of example(s) 1, further comprising: receiving, at a digitizer of the terminal, the modulated baseband frame at a receive time; and generating, by the digitizer of the terminal, a second digital IF packet containing the modulated baseband frame and the receive time, the receive time to be used at the terminal for synchronizing the terminal clock with the gateway clock.

Example 4 is the method of example(s) 3, wherein the release time and the reference time are computed based on the gateway clock and the receive time is recorded based on the terminal clock.

Example 5 is the method of example(s) 3, further comprising: sending the second digital IF packet from the digitizer of the terminal to a virtual receiver of the terminal; demodulating, by the virtual receiver, the modulated baseband frame to obtain the baseband frame; and tagging, by the virtual receiver, the receiver time to the baseband frame to produce a second tagged baseband frame.

Example 6 is the method of example(s) 5, further comprising: sending the second tagged baseband frame from the virtual receiver to a traffic adapter of the terminal; reading, by the traffic adapter, the reference time and the receive time from the second tagged baseband frame; and adjusting, by the traffic adapter, the terminal clock based on a comparison using the reference time and the receive time.

Example 7 is the method of example(s) 1, wherein the reference time is an estimated time at which the baseband frame is processed by the satellite, and wherein the reference time is computed based on the release time and a transmission and processing delay between the digitizer of the gateway and the satellite.

Example 8 is the method of example(s) 1, wherein the traffic adapter of the gateway is running at a compute infrastructure of the gateway.

Example 9 is a non-transitory computer-readable medium comprising instructions that, when executed by one or more processors, cause the one or more processors to perform operations comprising: receiving, at a gateway, protocol data units (PDUs) to be transmitted to a terminal via a satellite; computing, by a traffic adapter of the gateway, a release time at which a baseband frame containing the PDUs is to be released from a digitizer of the gateway for transmission to the terminal via the satellite, the release time being computed based on a transmission and processing delay between the traffic adapter of the gateway and the digitizer of the gateway; generating, by the traffic adapter of the gateway, the baseband frame containing the PDUs and a timing packet, the timing packet including a reference time for use at the terminal for synchronizing a terminal clock with a gateway clock; tagging, by the traffic adapter of the gateway, the release time to the baseband frame to produce a tagged baseband frame; generating a digital intermediate frequency (IF) packet containing a modulated baseband frame and the release time by: modulating the baseband frame; and inserting the release time from the tagged baseband frame into a header of the digital IF packet; and releasing, by the digitizer of the gateway, the modulated baseband frame at the release time for transmission to the terminal via the satellite.

Example 10 is the non-transitory computer-readable medium of example(s) 9, wherein the digital IF packet is generated by a virtual transmitter of the gateway, and wherein the operations further comprise: sending the tagged baseband frame from the traffic adapter of the gateway to the virtual transmitter; and sending the digital IF packet from the virtual transmitter to the digitizer of the gateway.

Example 11 is the non-transitory computer-readable medium of example(s) 9, wherein the operations further comprise: receiving, at a digitizer of the terminal, the modulated baseband frame at a receive time; and generating, by the digitizer of the terminal, a second digital IF packet containing the modulated baseband frame and the receive time, the receive time to be used at the terminal for synchronizing the terminal clock with the gateway clock.

Example 12 is the non-transitory computer-readable medium of example(s) 11, wherein the release time and the reference time are computed based on the gateway clock and the receive time is recorded based on the terminal clock.

Example 13 is the non-transitory computer-readable medium of example(s) 11, wherein the operations further comprise: sending the second digital IF packet from the digitizer of the terminal to a virtual receiver of the terminal; demodulating, by the virtual receiver, the modulated baseband frame to obtain the baseband frame; and tagging, by the virtual receiver, the receiver time to the baseband frame to produce a second tagged baseband frame.

Example 14 is the non-transitory computer-readable medium of example(s) 13, wherein the operations further comprise: sending the second tagged baseband frame from the virtual receiver to a traffic adapter of the terminal; reading, by the traffic adapter, the reference time and the receive time from the second tagged baseband frame; and adjusting, by the traffic adapter, the terminal clock based on a comparison using the reference time and the receive time.

Example 15 is the non-transitory computer-readable medium of example(s) 9, wherein the reference time is an estimated time at which the baseband frame is processed by the satellite, and wherein the reference time is computed based on the release time and a transmission and processing delay between the digitizer of the gateway and the satellite.

Example 16 is the non-transitory computer-readable medium of example(s) 9, wherein the traffic adapter of the gateway is running at a compute infrastructure of the gateway.

Example 17 is a system comprising: one or more processors; and a non-transitory computer-readable medium comprising instructions that, when executed by the one or more processors, cause the one or more processors to: receive, at a gateway, protocol data units (PDUs) to be transmitted to a terminal via a satellite; compute, by a traffic adapter of the gateway, a release time at which a baseband frame containing the PDUs is to be released from a digitizer of the gateway for transmission to the terminal via the satellite, the release time being computed based on a transmission and processing delay between the traffic adapter of the gateway and the digitizer of the gateway; generate, by the traffic adapter of the gateway, the baseband frame containing the PDUs and a timing packet, the timing packet including a reference time for use at the terminal for synchronizing a terminal clock with a gateway clock; tag, by the traffic adapter of the gateway, the release time to the baseband frame to produce a tagged baseband frame; generate a digital intermediate frequency (IF) packet containing a modulated baseband frame and the release time by modulating the baseband frame and inserting the release time from the tagged baseband frame into a header of the digital IF packet; and release, by the digitizer of the gateway, the modulated baseband frame at the release time for transmission to the terminal via the satellite.

Example 18 is the system of example(s) 17, wherein the digital IF packet is generated by a virtual transmitter of the gateway, and wherein the one or more processors are further configured to: send the tagged baseband frame from the traffic adapter of the gateway to the virtual transmitter; and send the digital IF packet from the virtual transmitter to the digitizer of the gateway.

Example 19 is the system of example(s) 17, wherein the one or more processors are further configured to: receive, at a digitizer of the terminal, the modulated baseband frame at a receive time; and generate, by the digitizer of the terminal, a second digital IF packet containing the modulated baseband frame and the receive time, the receive time to be used at the terminal for synchronizing the terminal clock with the gateway clock.

Example 20 is the system of example(s) 19, wherein the release time and the reference time are computed based on the gateway clock and the receive time is recorded based on the terminal clock.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1:
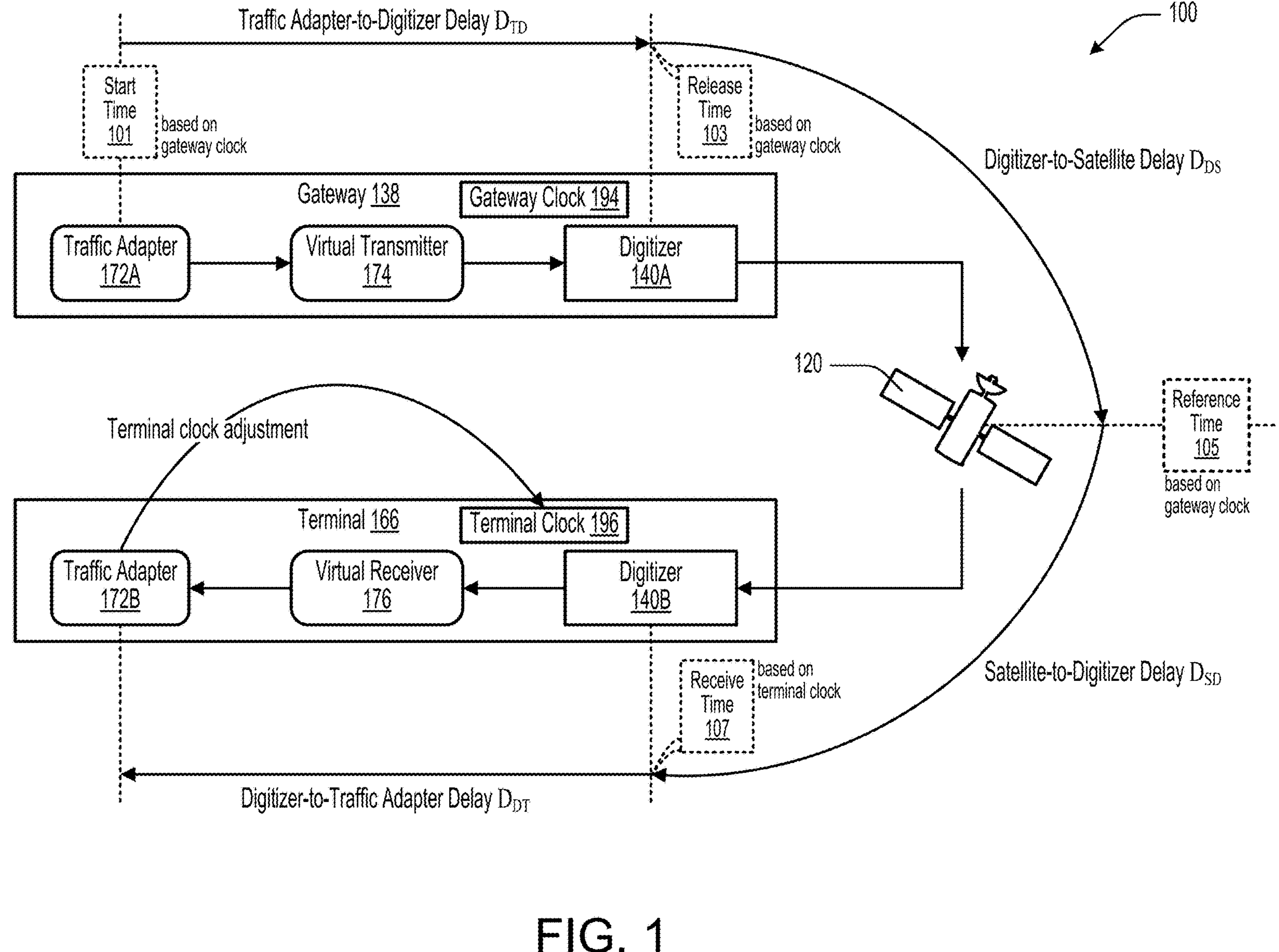
FIG. 1 illustrates an example satellite communication system including a gateway and a terminal.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Despite the widespread acceptance of Internet Protocol (IP) technology for communication and its various applications, including a shift to cloud and virtual platforms, the satellite industry has been slower in adopting this trend. This delay is attributed to the physical challenges posed by analog radio frequency (RF) technologies and the complexities associated with managing real-time data flow across IP networks. One challenge to achieving a fully enabled virtual ground station is how to reliably, confidently, and securely assure the conversion of RF waveforms into IP data without loss of quality. A second challenge is how to manage the distribution of this real-time data across IP networks and into cloud and virtual environments. These challenges are more than a simple digitization problem because hidden within each are several significant technical hurdles such as timing, network latency and jitter, error correction, among others.

Digital intermediate frequency (IF) technology expands the transmission of analog IF data onto IP-based networks. Digital IF offers the potential to introduce much-needed flexibility in ground station architectures. In some cases, through the use of IF digitizers and cloud processing resources, much of the conventional ground station architecture (typically consisting of an antenna, amplifiers, frequency converters, and a string of RF switches, modems, and other processing equipment) can be virtualized. The capability to digitize and transmit RF signals in real-time, without data loss, effectively eliminates the constraints of distance and signal degradation associated with analog RF. Overcoming these limitations has been a significant challenge for operators aiming to optimize infrastructure investments and leverage the latest technologies, whether it involves transitioning ground systems to the cloud, centralizing (or decentralizing) operations, or mitigating service interruptions caused by atmospheric effects.

In a satellite communication network, including those employing digital IF technology, the relationship between the clock of the gateway and the clock of the terminal is important for the proper functioning of the communication system. The synchronization of clocks ensures that both the gateway and the terminal operate with a common understanding of time, allowing the transmission and reception of signals to be coordinated while avoid timing discrepancies. Because the signals traveling between the satellite and the ground station experience a propagation delay due to the finite speed of light, synchronization can help in compensating for this delay, ensuring that the timing of transmissions and receptions is properly adjusted.

Embodiments of the present disclosure relate to systems and methods for handling timing in a satellite communication system. In some embodiments, a traffic adapter of the gateway may generate a baseband frame and produce timestamps that ensure that the release of the baseband frame from the gateway is trackable and that synchronization of a terminal clock with a gateway clock can be performed when the baseband frame is eventually received at the terminal. The timestamps may include a release time, which is tagged to the baseband frame, and a reference time, which is embedded within the baseband frame in a timing packet. Embodiments described herein are compatible with potential encryption requirements, which may prevent the modulator from performing any time restamping. Instead, the modulator may read the release time from the tagged baseband frame and insert it into the header of a digital IF packet. The gateway digitizer can read the release time from the header and orchestrate the release of the baseband frame for wireless transmission accordingly.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example satellite communication system 100 including a gateway 138 in communication with a terminal 166 via a satellite 120, in accordance with some embodiments of the present disclosure. Gateway 138 (e.g., a ground station) may include a gateway clock 194, a digitizer 140A, and a compute infrastructure running a set of virtual network functions (VNFs) including a traffic adapter 172A and a virtual transmitter 174. Terminal 166 (e.g., a user equipment) may include a terminal clock 196, a digitizer 140B, and a compute infrastructure running a set of VNFs including a traffic adapter 172B and a virtual receiver 176.

FIG. 1 shows various times that may be recorded, computed, and/or communicated between components to facilitate precise timing within satellite communication system 100. For example, one objective of some embodiments of the present disclosure may be to synchronize terminal clock 196 with gateway clock 194. Another objective of some embodiments of the present disclosure may be to allow traffic adapter 172A to handle the timing of baseband frames being released from digitizer 140A without modifying or relying upon the reference time embedded within each timing packet. To achieve these and other objectives, some embodiments of the present disclosure may include the following steps. First, traffic adapter 172A may record a start time 101 based on gateway clock 194 corresponding to the time a baseband frame containing one or more protocol data units (PDUs) is generated by traffic adapter 172A. To record start time 101, traffic adapter 172A may query gateway clock 194 for the current time (i.e., the current time according to gateway clock 194).

Next, traffic adapter 172A may compute a release time 103 based on gateway clock 194, where release time 103 corresponds to the time the (modulated) baseband frame is to be released from digitizer 140A for wireless transmission to terminal 166 via satellite 120. Release time 103 may be computed based on start time 101 and a transmission and processing delay between traffic adapter 172A and digitizer 140A (alternatively referred to as the traffic adapter-to-digitizer delay $D_{TD}$). The traffic adapter-to-digitizer delay $D_{TD}$ may be an estimated delay or a measured delay. In some examples, the following equation may be used: release time 103=start time 101+$D_{TD}$. Release time 103 may be communicated between traffic adapter 172A and digitizer 140A so that digitizer 140A can hold the modulated baseband frame in a buffer until it is released for transmission at release time 103.

Traffic adapter 172A may further compute a reference time 105 based on gateway clock 194, where reference time 105 corresponds to the time the modulated baseband frame is processed by satellite 120. Reference time 105 may be computed based on release time 103 and a transmission and processing delay between digitizer 140A and satellite 120 (alternatively referred to as the digitizer-to-satellite delay $D_{DS}$). The digitizer-to-satellite delay DDS may be an estimated delay or a measured delay. In some examples, the following equation may be used: reference time 105=release time 103+$D_{DS}$. Reference time 105 may be communicated between traffic adapter 172A and traffic adapter 172B so that traffic adapter 172B can use reference time 105 to adjust terminal clock 196.

On the terminal side, digitizer 140B may record a receive time 107 based on terminal clock 196, where receive time 107 corresponds to the time the modulated baseband frame is received by digitizer 140B. To record receive time 107, digitizer 140B may query terminal clock 196 for the current time (i.e., the current time according to terminal clock 196). Receive time 107 may be communicated between digitizer 140B and traffic adapter 172B so that traffic adapter 172B can use receive time 107, reference time 105, and a transmission and processing delay between satellite 120 and digitizer 140B (alternatively referred to as the satellite-to-digitizer delay $D_{SD}$) to adjust terminal clock 196. The satellite-to-digitizer delay $D_{SD}$ may be an estimated delay or a measured delay. In some examples, a transmission and processing delay between digitizer 140B and traffic adapter 172B (alternatively referred to as the digitizer-to-traffic adapter delay $D_{DT}$) may be estimated or measured to facilitate precise timing within satellite communication system 100.

Figure 2:
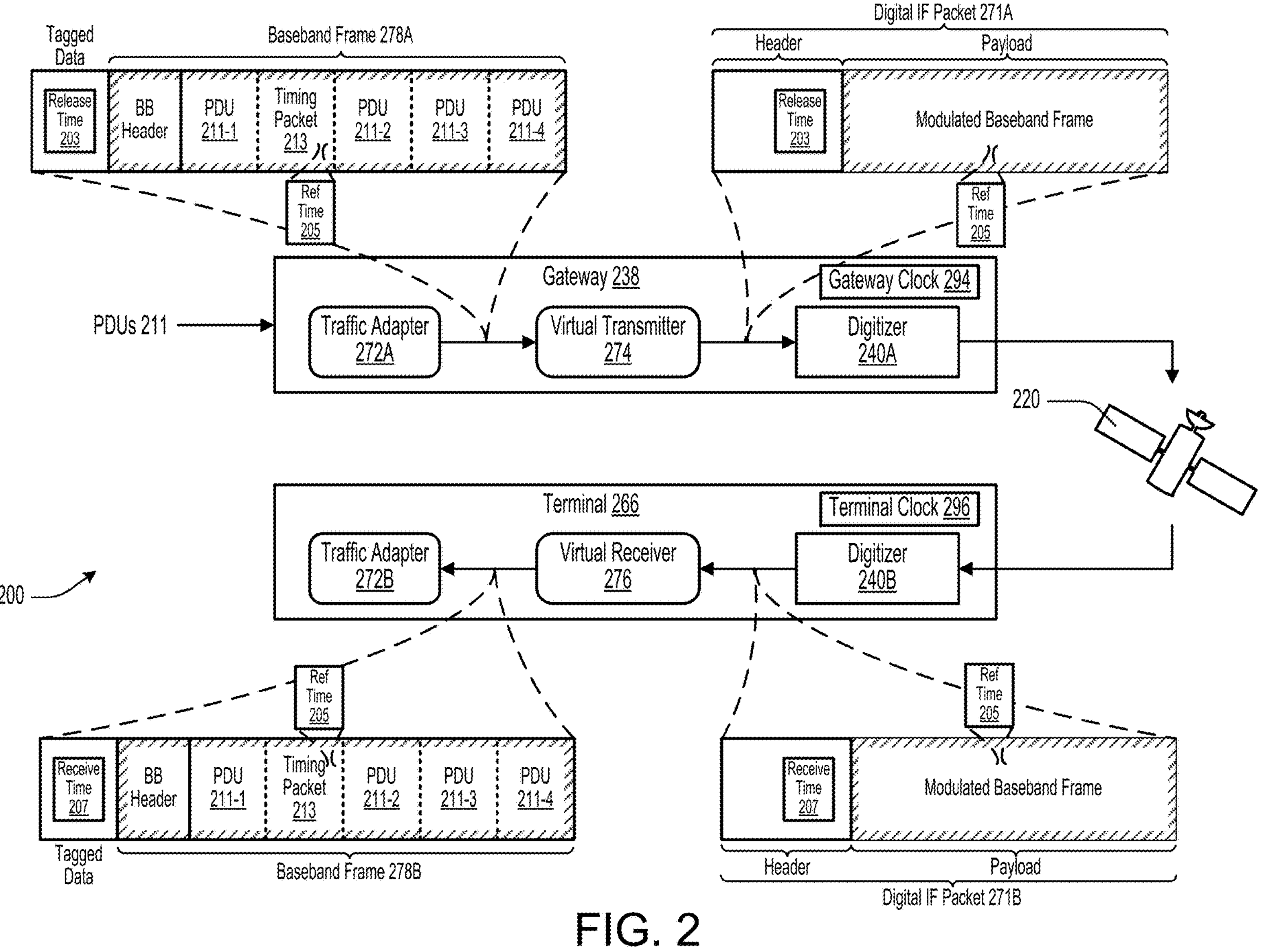
FIG. 2 illustrates an example satellite communication system including a gateway and a terminal.

FIG. 2 illustrates an example satellite communication system 200 including a gateway 238 in communication with a terminal 266 via a satellite 220, in accordance with some embodiments of the present disclosure. Similar to satellite communication system 100 described in FIG. 1, gateway 238 may include a gateway clock 294, a digitizer 240A, and a compute infrastructure running a set of VNFs including a traffic adapter 272A and a virtual transmitter 274, and terminal 266 may include a terminal clock 296, a digitizer 240B, and a compute infrastructure running a set of VNFs including a traffic adapter 272B and a virtual receiver 276.

In some examples, gateway 238 may receive a set of PDUs 211 over a terrestrial network. Each of PDUs 211 may have a destination address for terminal 266 such that PDUs 211 are to be transmitted to terminal 266 via satellite 220. Upon receiving PDUs 211, traffic adapter 272A may begin generating a baseband frame 278A. Traffic adapter 272A may record a current time (or "start time") of gateway clock 294, and may then compute a release time 203 corresponding to the time at which baseband frame 278A is to be released from digitizer 240A for wireless transmission to terminal 266 via satellite 220. Release time 203 may be computed based on the recorded current time and a transmission and processing delay between traffic adapter 272A and digitizer 240A.

Traffic adapter 272A may also compute a reference time 205 to be included in a timing packet 213 for baseband frame 278A. In some examples, reference time 205 may correspond to the time at which baseband frame 278A is processed by satellite 220. Reference time 205 may be computed based on release time 203 and a transmission and processing delay between digitizer 240A and satellite 220. Traffic adapter 272A may generate baseband frame 278A to include PDUs 211 and timing packet 213, and may insert reference time 205 into timing packet 213. Traffic adapter 272A may tag release time 203 to baseband frame 278A by attaching data (or "tagged data") that includes release time 203 to the beginning or end of baseband frame 278A.

Baseband frame 278A and its tagged data may be sent from traffic adapter 272A to virtual transmitter 274, which may generate a digital IF packet 271A having a header and payload. Virtual transmitter 274 may read release time 203 from the tagged data and insert release time 203 into the header of digital IF packet 271A. Virtual transmitter 274 may modulate baseband frame 278A to create a digital IF waveform, which may be inserted by virtual transmitter 274 into the payload of digital IF packet 271A. In some examples, virtual transmitter 274 may not read or modify reference time 205, and may allow timing packet 213 to pass through virtual transmitter 274 without modification.

Virtual transmitter 274 may send digital IF packet 271A to digitizer 240A, which may read release time 203 and determine the relationship between the current time of gateway clock 294 and release time 203. If the current time is before release time 203, digitizer 240A may store the modulated baseband frame in a buffer within digitizer 240A and wait until the current time equals release time 203. If the current time is equal to release time 203, digitizer 240A may release the modulated baseband frame from the buffer (if it is currently being stored) and may convert the digital IF waveform into an analog signal and send the analog signal to the antenna (and optionally an up-converter) for wireless transmission. If the current time is after release time 203, digitizer 240A may generate an error signal to notify traffic adapter 272A of the late-arriving packet but may still convert the digital IF waveform and transmit the analog signal to the antenna for wireless transmission.

Upon receiving the analog signal, digitizer 240B may record a receive time 207 using the current time of terminal clock 296. Digitizer 240B may digitize the analog signal to produce a digital IF waveform of the modulated baseband frame. Digitizer 240B may generate a digital IF packet 271B having a header and payload, and may insert receive time 207 into the header of digital IF packet 271B and the digital IF waveform of the modulated baseband frame into the payload. Digital IF packet 271B may be sent from digitizer 240B to virtual receiver 276, where the modulated baseband frame is demodulated to obtain baseband frame 278B containing PDUs 211 and timing packet 213, thereby recovering the data from baseband frame 278A. Virtual receiver 276 may tag receive time 207 to baseband frame 278B by attaching data (or "tagged data") that includes receive time 207 to the beginning or end of baseband frame 278B.

Baseband frame 278B and its tagged data may be sent from virtual receiver 276 to traffic adapter 272B, which may read receive time 207 from the tagged data and reference time 205 from timing packet 213. Traffic adapter 272B may use receive time 207 and reference time 205 to synchronize terminal clock 296 with gateway clock 294 by, for example, sending a timing correction message to digitizer 240B, which may manage terminal clock 296, or by modifying terminal clock 296 directly (in embodiments in which traffic adapter 272B manages terminal clock 296 directly). In some examples, traffic adapter 272B may compare receive time 207 with reference time 205 added to a transmission and processing delay between satellite 220 and digitizer 240B. Traffic adapter 272B may shift terminal clock 296 forward or backward based on the difference between the two quantities. For example, if receive time 207 exceeds the sum of reference time 205 and the transmission and processing delay between satellite 220 and digitizer 240B, traffic adapter 272B may shift terminal clock 296 backward by the exceeded amount. As another example, if instead the sum of reference time 205 and the transmission and processing delay between satellite 220 and digitizer 240B exceeds receive time 207, traffic adapter 272B may shift terminal clock 296 forward by the exceeded amount.

Figure 3:
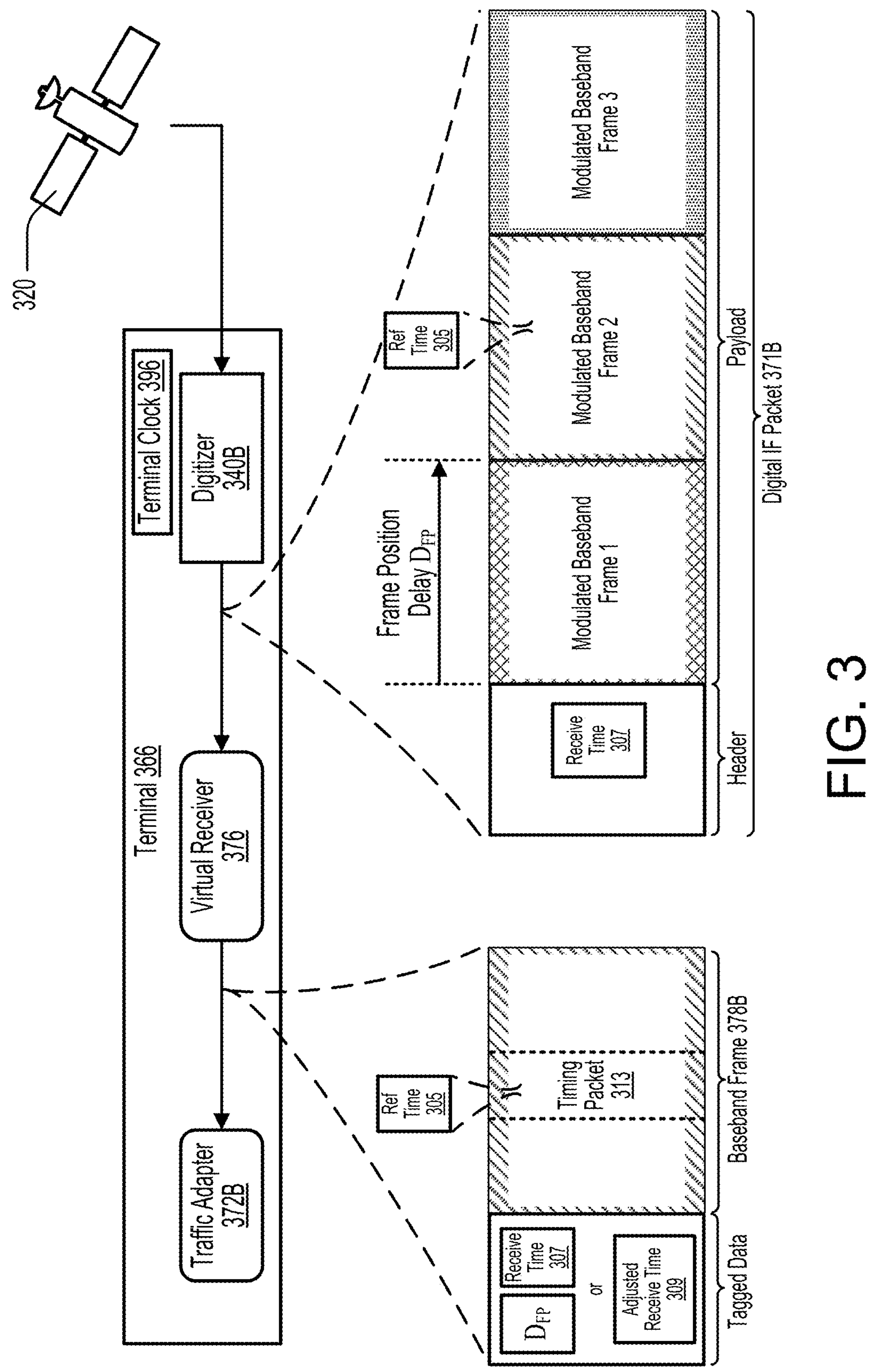
FIG. 3 illustrates an example adjustment of a receive time based on the position of a baseband frame of interest within a digital IF packet.

FIG. 3 illustrates an example adjustment of a receive time 307 based on the position of the baseband frame of interest within a digital IF packet 371B, in accordance with some embodiments of the present disclosure. In the illustrated example, multiple modulated baseband frames are received via a satellite 320 at a digitizer 340B. Upon receiving the analog signal, digitizer 340B may record a receive time 307 (based on terminal clock 396) corresponding to the arrival of the first samples to be included in digital IF packet 371B, which may not correspond to the first samples of the baseband frame of interest. After digitizing each of the modulated baseband frames to be included in digital IF packet 371B and inserting receive time 307 into the header of digital IF packet 371B, digitizer 340B may send digital IF packet 371B to a virtual receiver 376.

In some examples, upon receiving digital IF packet 371B, virtual receiver 376 may compute a frame position delay $D_{FP}$ between the first samples of the first modulated baseband frame in digital IF packet 371B (e.g., modulated baseband frame 1) and the first samples of the modulated baseband frame of interest in digital IF packet 371B (e.g., modulated baseband frame 2). Virtual receiver 376 may demodulate the modulated baseband frames and generate a baseband frame 378B including a timing packet 313 and a reference time 305. Virtual receiver 376 may either tag both receive time 307 and frame position delay $D_{FP}$ to baseband frame 378B or it may compute an adjusted receive time 309 based on receive time 307 and frame position delay $D_{FP}$ and tag adjusted receive time 309 to baseband frame 378B. Such time(s) may be tagged to baseband frame 378B by attaching data (or "tagged data") to the beginning or end of baseband frame 378B.

Baseband frame 378B and its tagged data may be sent from virtual receiver 376 to traffic adapter 372B, which may read receive time 307, frame position delay $D_{FP}$, and/or adjusted receive time 309 from the tagged data and reference time 305 from timing packet 313. If not yet computed, traffic adapter 372B may compute adjusted receive time 309 and use it along with reference time 305 to synchronize terminal clock 396 with the gateway clock, as described herein. For example, traffic adapter 372B may compare adjusted receive time 309 with the sum of reference time 305 and a transmission and processing delay between satellite 320 and digitizer 340B and shift terminal clock 396 forward or backward based on the difference between the two quantities.

Figure 4:
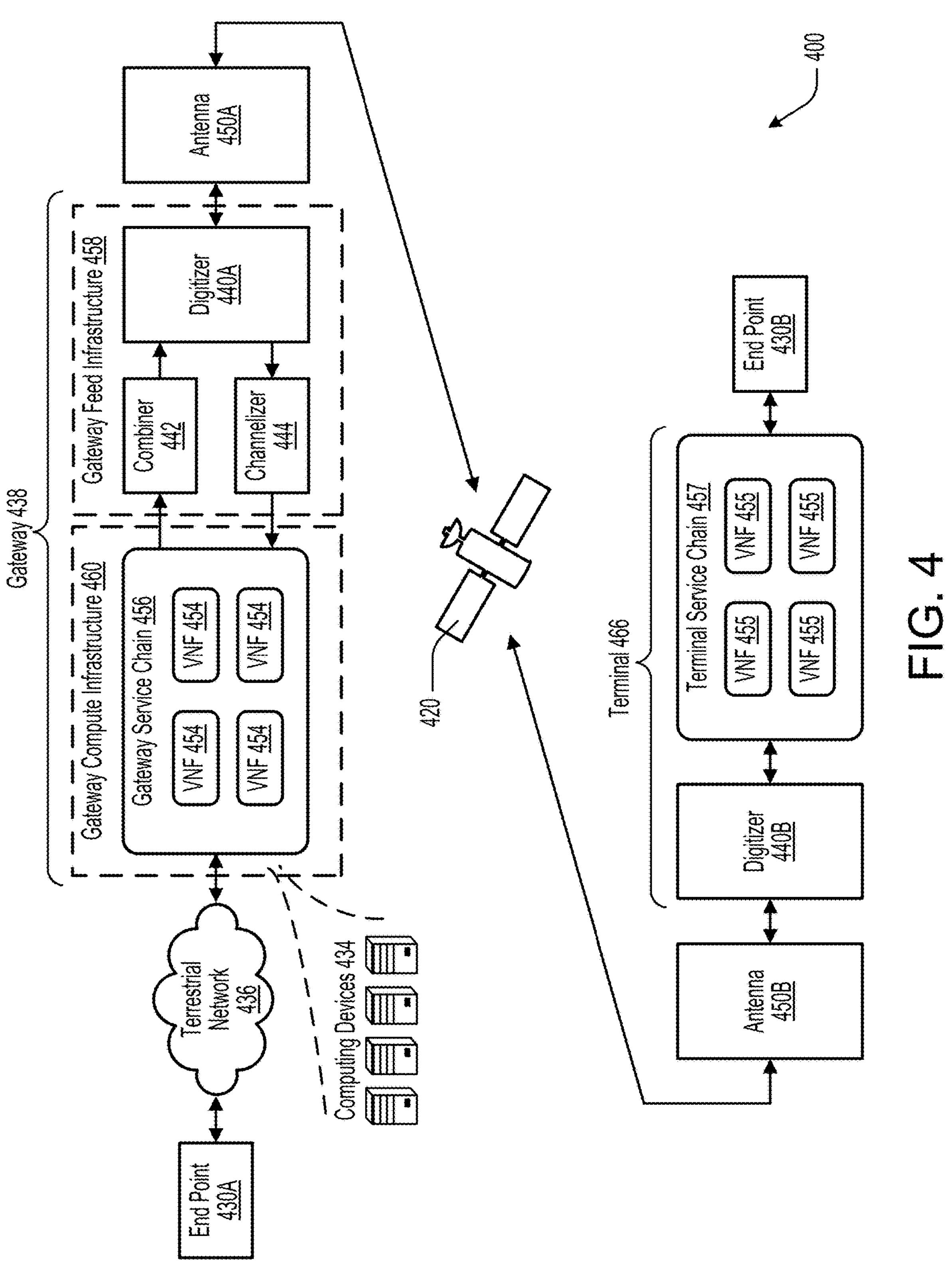
FIG. 4 illustrates an example communication path between end points enabled by a satellite communication system.

FIG. 4 illustrates an example communication path between an end point 430A and an end point 430B enabled by a satellite communication system 400, in accordance with some embodiments of the present disclosure. In the illustrated example, satellite communication system 400 includes a gateway 438 in communication with a terminal 466 via a satellite 420. In various examples, satellite 420 may send and receive wireless signals within one or more bands of a number of possible frequency bands between 1-300 GHz including, for example, 1 GHz and 300 GHz, including L Band (1-2 GHz), C-Band (4-8 GHZ), X-Band (8-12 GHz), Ku-Band (12-18 GHz), Ka-Band (26.5-40 GHz), S-Band (2-4 GHZ), and V-Band (40-75 GHz).

In various examples, end points 430 may correspond to portable mobile devices, internet of things (IoT) devices, desktop computers, user terminals, or any of a number of devices with communication capabilities. Alternatively, end points 430 may correspond to networks such as mobile towers, mining sites, ships, planes, or the like. In one example, end point 430A may correspond to a service and end point 430B may correspond to a consumer. It should be understood that the satellite communication environment may comprise other end points 410 and/or other arrangements of components than those illustrated. Furthermore, multiple communication paths may be constructed and operated in parallel, and separate communication paths may have different arrangements from each other.

End point 430A may be communicatively connected via a terrestrial network 436 (e.g., comprising the Internet, a private telecom backbone, or a cloud compute center) to a gateway 438. Gateway 438 may include one or more switches (not shown) to facilitate communication between the various components, such as a first switch at the boundary between terrestrial network 436 and a gateway compute infrastructure 460, and a second switch at the boundary between gateway compute infrastructure 460 and a gateway feed infrastructure 458. Such switches may be physical or virtual Gigabit Ethernet (GigE) switches. However, it should be understood that the above-described first and second switches could be implemented in the same switch. In some examples, the first switch may implement transport from terrestrial network 436 to a VNF 454 within a gateway service chain 456. In such a case, VNF 454 may act as a User Network Interface (UNI) or an External Network-Network Interface (ENNI) as defined by the applicable MEF Ethernet services and MEF operator services standards. Alternatively, the first switch may itself represent the UNI as defined by the applicable MEF standards.

Gateway compute infrastructure 460 may include a set of computing devices 434 situated onsite (at a same physical location) or offsite (at a different physical location) relative to antenna 450. In some examples, computing devices 434 may comprise general-purpose computers or servers capable of running VNFs 454 and other virtualization software such as hypervisors to support gateway service chain 456. In some examples, computing devices 434 may employ x86 architectures, ARM architectures, RISC-V architectures, among other possibilities. Computing devices 434 may be configured as clusters, data centers, warehouse-scale computers, among other possibilities. Gateway compute infrastructure 460 may further include suitable storage systems that provide persistent and reliable storage in support of VNFs 454.

In some examples, gateway compute infrastructure 460 may include a managing system that instantiates and configures one or more VNFs 454 to form gateway service chain 456. Two sets of one or more VNFs 454 may provide two-way communication, including a transmission path and a reception path, between terrestrial network 436 and a gateway feed infrastructure 458 of gateway 456. It should be understood that in an example in which gateway service chain 456 provides only one-way communication, VNFs 454 may provide only a transmission path without providing a reception path. The set of VNFs 454 (e.g., implementing a gateway) on the forward path towards the link to satellite 420, may comprise or constitute a traffic handler, an encapsulator (e.g., implementing generic stream encapsulation (GSE)), a modulator (e.g., the OpenSpace™ Wideband Software modulator, offered by Kratos Defense & Security Solutions, Inc. of San Diego, California), a combiner, an encryption/decryption VNF, a time division multiple access (TDMA) resource allocator, an antenna controller, among other possibilities.

This set of VNFs 454 on the transmission path may convert PDUs into a digital signal (such as a digital intermediate frequency (IF) waveform or a composite digital IF waveform). For example, the traffic handler may process data link layer (e.g., Layer 2 or L2 in the Open Systems Interconnection (OSI) model) and/or network layer (e.g., Layer 3 or L3 in the OSI model) traffic, and provide the processed Ethernet frames or IP packets to the encapsulator. The encapsulator may convert the PDUs into baseband frames, and provide the baseband frames to the modulator. A baseband frame may be the basic unit of transmission in satellite communication system 400. The encapsulator may form baseband frames in accordance with the 5G standard, the DVB-S2x standard, described in European Telecommunications Standards Institute (ETSI) European Standard (EN) 302 307-1 v1.4.1 (2014-11), among other possible standards. The encapsulator may comprise one or more VNFs 454 (or software subprocesses) that perform one or more of the following functions: frame chopping, forward modulation selection (e.g., with Adaptive Coding and Modulation (ACM)), Ethernet bridge (e.g., Media Access Control (MAC) table, smart bridging/learning/relay, etc.), Address Resolution Protocol (ARP) (e.g., Ethernet MAC discovery), VLAN manipulation (e.g., to rewrite Ethernet frames on ingress/egress based on the MEF service definition), header compression (e.g., Robust Header Compression (ROHC)); and/or OTA optimization (e.g., Space Communications Protocol Specifications (SCPS)/TCP-Acceleration). The modulator may convert the baseband frames into signal data packets in accordance with a particular standard, including the standards of the Digital Intermediate Frequency Interoperability (DIFI) Consortium in the DIFI/Institute of Electrical and Electronics Engineers (IEEE) 1.0 specification, the VMEbus International Trade Association (VITA) standard, the enhanced Common Public Radio Interface (eCPRI) standard, among other possibilities. In an embodiment, the encapsulator and the traffic handler may be implemented as a single VNF 454, referred to as a virtualized traffic adaptor (vModem). The VNF-implemented combiner or a combiner 442 (implemented in hardware) may combine the signal data packets into a digital signal and provide the digital signal to a digitizer 440A, which may convert the digital signal into an analog signal.

The set of VNFs 454 on the return path may comprise or constitute, in order, a digital channelizer (e.g., the OpenSpace™ Wideband Channelizer, offered by Kratos Defense & Security Solutions, Inc. of San Diego, California), a demodulator (e.g., the OpenSpace™ Wideband Software Receiver, offered by Kratos Defense & Security Solutions, Inc. of San Diego, California), and a decapsulator. This set of VNFs 454 on the reception path may convert a digital signal (such as a digital IF waveform or a composite digital IF waveform) to PDUs, which may be Ethernet frames or IP packets, among other possibilities. For example, the VNF-implemented channelizer or a channelizer 444 (implemented in hardware) may receive a digital signal from digitizer 440A, which has converted an analog signal into the digital signal, and divide the digital signal into signal data packets. The demodulator may convert the signal data packets to baseband frames, and provide the baseband frames to the decapsulator. The decapsulator may convert the baseband frames into PDUs, which may be transmitted, via terrestrial network 436, to end point 430A. It should be understood that the demodulator performs the reverse function(s) of the modulator, and the decapsulator performs the reverse function(s) of the encapsulator. In an embodiment, the decapsulator and demodulator may be implemented as a single VNF 454, for example, together with the traffic handler, encapsulator, and modulator, in a vModem. In other words, a vModem may consist of a single VNF 454 that implements all of the functions of the traffic handler, encapsulator/decapsulator, and modulator/demodulator.

In some embodiments, in which gateway service chain 456 implements a vModem, the vModem may comprise one or more modulators that are configured to modulate waveforms according to a digital satellite broadcast standard and/or one or more demodulators that are configured to demodulate waveforms according to a digital satellite broadcast standard. Such a vModem may provide carrier ethernet (CE) services, in which case the vModem may comprise one or more encapsulators that convert Ethernet frames into baseband frames that are modulated into waveforms by the modulator(s), and one or more decapsulators that convert baseband frames, which have been demodulated from waveforms by the demodulator(s), into Ethernet frames. The digital satellite broadcast standard may be a digital satellite television broadcast standard, such as the DVB-S2X standard managed by the Digital Video Broadcasting (DVB) Project. While a digital satellite broadcast standard, such as a DVB standard, is used as an example, the vModem may be configured to modulate and demodulate waveforms according to other standards for wideband digital communication, such as orthogonal frequency-division multiplexing (OFDM), or the like.

The digital signal from combiner 442 is transmitted to digitizer 440A, which converts the digital signal output by combiner 442 into an analog transmission signal for communication to satellite 420. Digitizer 440A further digitizes analog reception signals from satellite 420 into digital signals for use by channelizer 444. In some examples, digitizer 440A may be software-defined. As one example, digitizer 440A may be a SpectralNet™, which is a carrier-grade RF digitizer, offered by Kratos Defense & Security Solutions, Inc. of San Diego, California. Digitizer 440A communicates with antenna 450A. In particular, digitizer 440A provides the transmission signal to antenna 450A, which transmits the transmission signal to satellite 420. In addition, in two-way communications, antenna 450A receives a reception signal from satellite 420, and provides the reception signal to digitizer 440A.

In various examples, antenna 450A may be a parabolic reflector antenna, a flat panel antenna, a phased array antenna, a helical antenna, a patch antenna, a horn antenna, among other possibilities. In some examples, antenna 450A may be an electronically steered antenna that can use electronic means to control the direction and shape of its radiation pattern. Such an antenna can generate multiple beams simultaneously, allowing it to transmit or receive signals in multiple directions at the same time. Antenna 450A may include both the physical antenna as well as the corresponding radio frequency (RF) subsystem, which may include a combination of diplexers, amplifiers (e.g., low noise amplifiers (LNAs)), upconverters, and downconverters (e.g., low-noise block downconverters (LNBs) depending on the specific frequency band and application.

Satellite 420 relays wireless signals from antenna 450A to antenna 450B. In two-way communications, satellite 420 also relays wireless signals from antenna 450B to antenna 450A. Antenna 450B may be functionally similar or identical to antenna 450A, and therefore, any description of antenna 450A applies equally to antenna 450B, which may not be redundantly described herein. Similarly, digitizer 440B may be functionally similar or identical to digitizer 440A, and therefore, any description of digitizer 440A applies equally to digitizer 440B, which may not be redundantly described herein.

Digitizer 440B may communicate directly with a terminal service chain 457 of a terminal compute infrastructure. Terminal service chain 457 may comprise a set of VNF(s) 455 forming a reception path from digitizer 440B to end point 430B. In two-way communications, terminal service chain 457 may also comprise a set of VNFs 455 forming a transmission path from end point 430B to digitizer 440B.

The reception and transmission paths may be identical or similar to the reception and transmission paths described with respect to gateway service chain 456. For example, the reception path may comprise a demodulator followed by a decapsulator to convert signal frames into PDUs, and the transmission path may comprise an encapsulator followed by a modulator to convert PDUs into signal frames. The traffic handler, encapslator, decapsulator, modulator, and demodulator may all be similar or identical to those described with respect to gateway service chain 456, and therefore, the descriptions of those components with respect to gateway service chain 456 apply equally to those components in terminal service chain 457.

Terminal service chain 457 may communicate with end point 430B. For example, the traffic handler of terminal service chain 457 may transmit Ethernet frames to end point 430B. In addition, in two-way communications, the encapsulator of terminal service chain 457 may receive Ethernet packets from end point 430B. Thus, the combination of gateway service chain 456 and terminal service chain 457 enable one-way or two-way communications between end points 410A and 410B over a satellite link.

Gateway service chain 456 and terminal service chain 457 may comprise one or more of the software-defined components (e.g., VNFs and/or digitizers) described in International Patent App. Nos. PCT/US2021/033867, filed on May 24, 2021, PCT/US2021/033875, filed on May 24, 2021, PCT/US2021/033905, filed on May 24, 2021, and PCT/US2021/062689, filed on Dec. 9, 2021, which are all hereby incorporated herein by reference as if set forth in full.

Advantageously, the utilization of VNFs and software-defined components (e.g., digitizers 440A and 440B) to perform various functions, aid in automation and scalability. Embodiments may minimize the presence of physical hardware components, such that satellite communication system 400 can be dynamically reconfigured (e.g., added, updated, destroyed, increased or decreased in dimension, etc.) in real time, primarily using in-band network communications, to adapt to the unique multivariate satcom environment (e.g., changing traffic patterns, RF interference, atmospheric characteristics, antenna conditions, path length, etc.).

Notably, dynamic reconfiguration of VNFs in a cloud computing environment can be used, not only to increase the dimensions of the computing resources (e.g., number of vCPUs, amount of memory and/or disk storage, network throughput, etc.) used for satellite communication system 400 on demand to ensure the sufficiency of the satellite communication system, but also to decrease the dimensions of the computing resources on demand to optimize the utilization of the hardware. For example, favorable changes in the satcom environment may improve performance of satellite communication system 400, such that satellite communication system 400 is providing significantly better performance than is required by the service level agreement. In this case, the management system may determine that gateway service chain 456 and terminal service chain 457 are insufficient, and update the service chains to reduce the resources used in the service chains (e.g., by reducing RF bandwidth usage, resizing one or more VNFs, swapping to a service chain with reduced dimensions, etc.). This is in contrast to conventional hardware-based service chains in which unused resources would simply be idled or otherwise ignored, representing a sunk cost that cannot be recouped.

Figure 5:
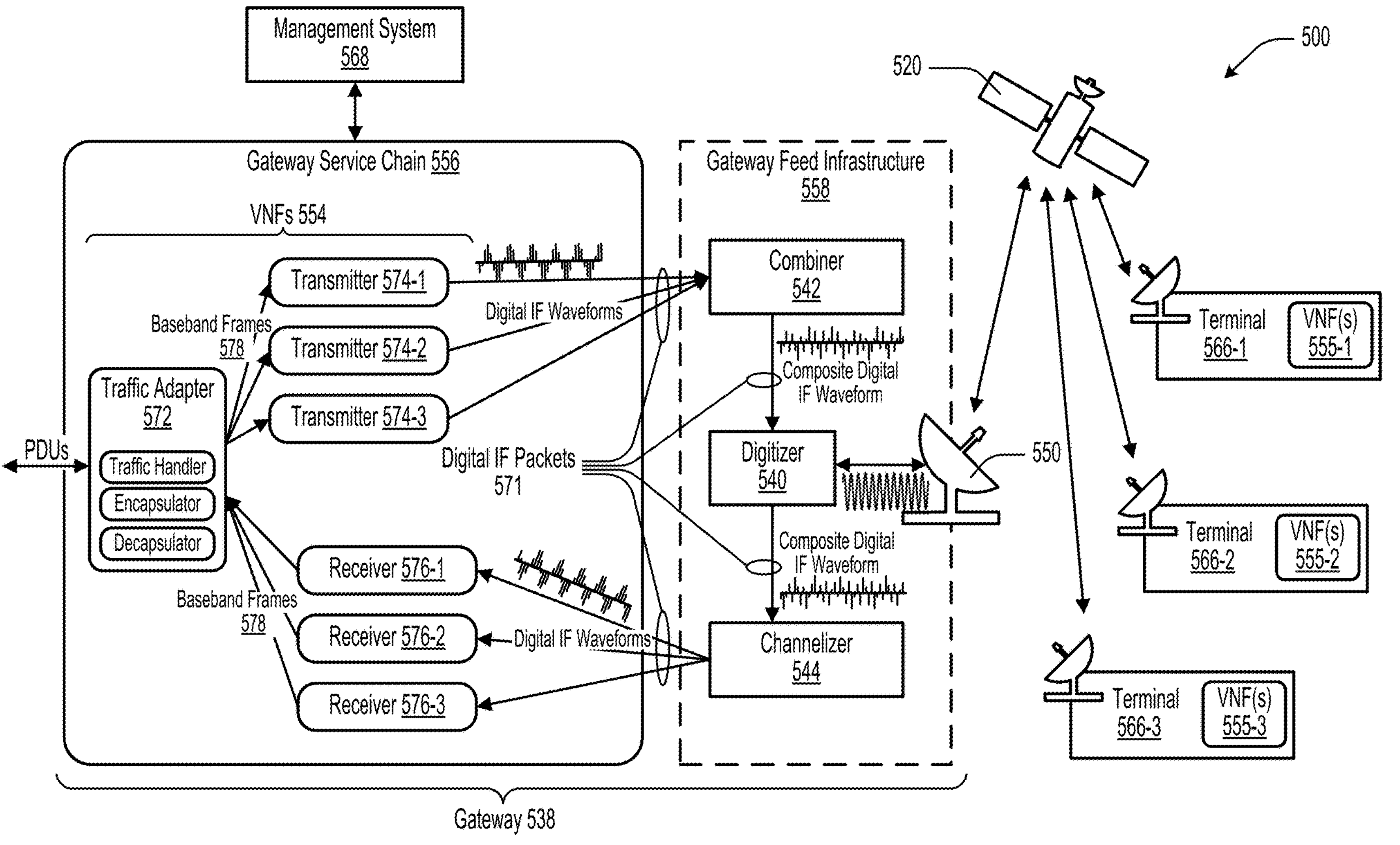
FIG. 5 illustrates an example satellite communication system including a gateway and a set of terminals.

FIG. 5 illustrates an example satellite communication system 500 including a gateway 538 and a set of terminals 566 (or "remote terminals"), in accordance with some embodiments of the present disclosure. In the illustrated example, satellite communication system 500 includes a gateway 538 (or "hub") in communication with each of terminals 566 via a satellite 520. Gateway 538 may include a gateway feed infrastructure 558 that serves as an onsite infrastructure (close to antenna 550, e.g., at a same physical location) that may perform primarily signal digitization and signal routing-related tasks and a gateway compute infrastructure that can be onsite or offsite infrastructure (far from antenna 550, e.g., at a different physical location) that supports a gateway service chain 556 that performs primarily signal processing and packet processing-related tasks. The gateway compute infrastructure may include one or more computers, clusters, a data center, or a warehouse-scale computer. The computing devices comprising the gateway compute infrastructure and/or gateway feed infrastructure 558 may include general-purpose computers or servers employing x86 architectures, ARM architectures, RISC-V architectures, among other possibilities.

Gateway 538 may include a gateway service chain 556 comprising a set of VNFs 554 running on the gateway compute infrastructure. Example VNFs include one or more traffic adapters 572, one or more virtual transmitters 574, one or more virtual receivers 576, among other possibilities. Each of VNFs 554 may be instantiated and configured by a management system 568 that scales up or down the number of active VNFs based on the number of active terminals 566. Management system 568 may further configure VNFs 554 such that satellite communication system 500 implements any one of a number of network topologies, including a single channel per carrier (SCPC) network, a TDMA network, a frequency division multiple access (FDMA) network, a mesh network, among other possibilities.

VNFs 554 may include one or more virtual transmitters 574 that provide one or more transmission paths between a terrestrial network and a gateway feed infrastructure 558 of gateway 556. Each of the set of virtual transmitters 574 on a transmission path may comprise or constitute a modulator (e.g., the OpenSpace™ Wideband Software modulator) that converts incoming baseband frames 578 into digital IF packets 571 containing digital waveforms at IF or RF frequencies (or "digital IF waveforms"). Traffic adapter 572 acts as the bridge between the terrestrial network and the satellite network. In some examples, traffic adapter 572 may include a traffic handler that processes data link layer (e.g., Layer 2 in the OSI model) and/or network layer (e.g., Layer 3 in the OSI model) traffic and provides the processed PDUs to the encapsulator, which convert the PDUs into baseband frames 578 and provides baseband frames 578 to one of virtual transmitters 574. Each of virtual transmitters 574 may implement a modulator that converts baseband frames 578 into digital IF packets 571 (e.g., according to the standards of the DIFI Consortium in the DIFI/IEEE 1.2 specification) to create the digital IF waveforms.

Digital IF packets 571 generated by virtual transmitters 574 may be fed into a combiner 542 that combines the multiple digital IF waveforms into a single composite signal (or "composite digital IF waveform"). Digital IF packets 571 containing the composite digital IF waveform is fed into a digitizer 540 that converts the digital signal into an analog signal in preparation for wireless transmission via an antenna 550. While combiner 542 is illustrated in FIG. 5 as being an element of gateway feed infrastructure 558, it is to be understood that a combiner VNF (or multiple combiner VNFs) may be instantiated by management system 568 to perform similar functionality.

On the reception path, digitizer 540 digitizes analog signals received from satellite 520 to generate digital IF packets 571 containing digital IF waveforms (e.g., a composite digital IF waveform) of the received analog signals for use by a channelizer 544. The composite digital IF waveform received by channelizer 544 may be a wide-band spectrum (e.g., 100 MHz, 500 MHZ, 300 GHz, etc.) that may contain several signals within that segment of the frequency band. In some instances, channelizer 544 divides the composite digital IF waveform into separate digital IF waveforms and sends the waveforms (in the form of digital IF packets 571) to appropriate virtual receivers 576. While channelizer 544 is illustrated in FIG. 5 as being an element of gateway feed infrastructure 558, it is to be understood that a channelizer VNF (or multiple channelizer VNFs) may be instantiated by management system 568 to perform similar functionality. VNFs 554 may include one or more virtual receivers 576 that provide one or more reception paths between gateway feed infrastructure 558 and a terrestrial network. Each of the set of virtual receivers 576 on a reception path may comprise or constitute a demodulator (e.g., the OpenSpace™ Wideband Software Receiver) that converts incoming digital IF packets 571 containing digital IF waveforms into baseband frames 578. In some examples, baseband frames 578 produced by virtual receivers are sent to the decapsulator of traffic adapter 572. The decapsulator may convert baseband frames 578 into Ethernet frames and pass the Ethernet frames to the traffic handler, which processes and provides the Ethernet frames to a terrestrial network.

Satellite 520 relays wireless signals from antenna 550 to the antennas of terminals 566, or vice versa. In two-way communications, satellite 520 also relays wireless signals from the antennas of terminals 566 to antenna 550. In some examples, each of terminals 566 may include hardware infrastructure to support one or more VNFs 555. In some examples, VNFs 555 at each of terminals 566 may implement a vModem that comprises one or more modulators that are configured to modulate waveforms according to a digital satellite broadcast standard and/or one or more demodulators that are configured to demodulate waveforms according to the digital satellite broadcast standard. Such a vModem may provide CE services, in which case the vModem may comprise one or more encapsulators that convert Ethernet frames into baseband frames that are modulated into waveforms by the modulator(s), and one or more decapsulators that convert baseband frames, which have been demodulated from waveforms by the demodulator(s), into Ethernet frames, together with a traffic handler that connects the encapsulators and decapsulators with the terrestrial networks connected to terminals 566.

Figure 6:
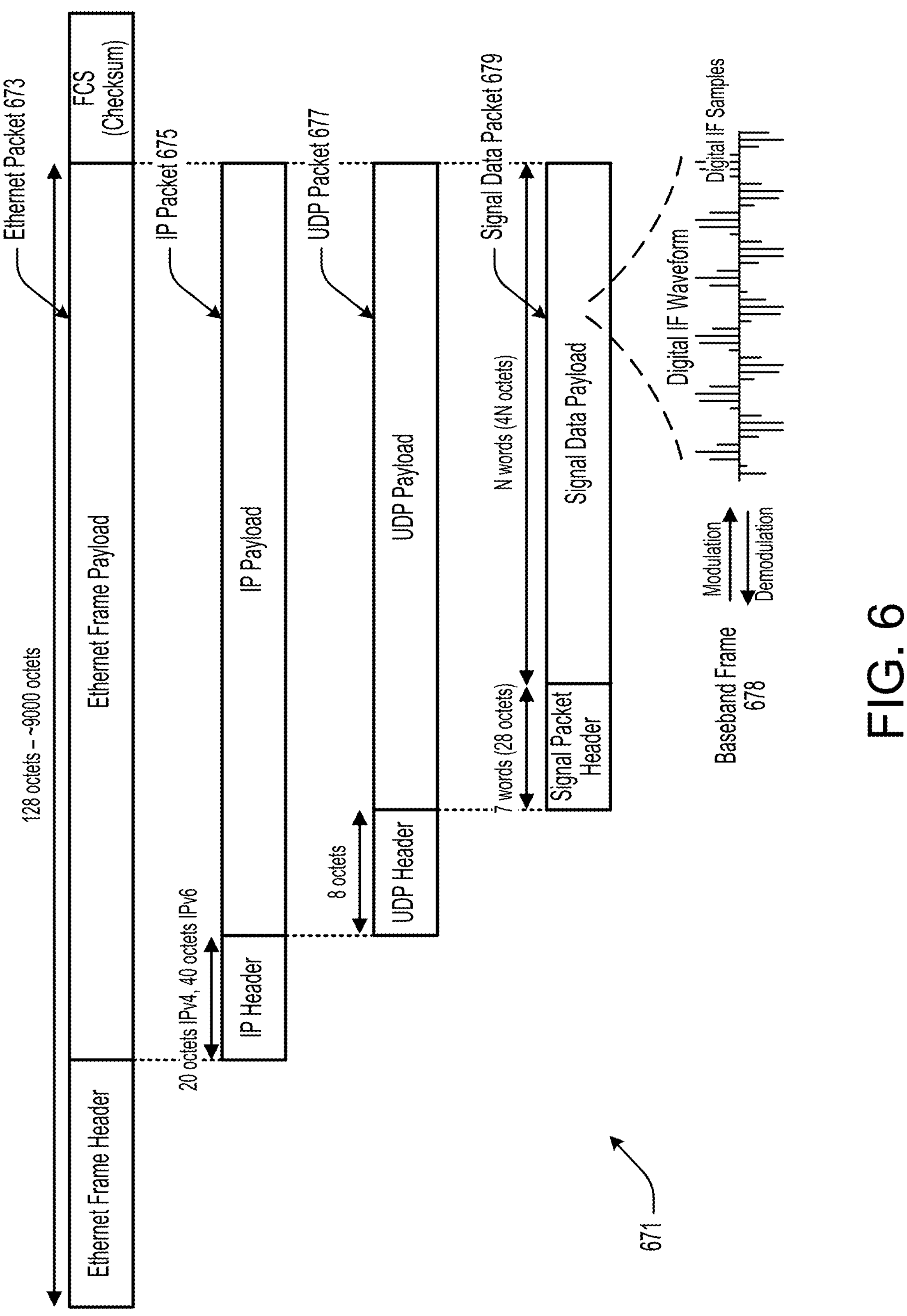
FIG. 6 illustrates an example digital IF packet with multiple protocol layers.

FIG. 6 illustrates an example digital IF packet 671 with multiple protocol layers, in accordance with some embodiments of the present disclosure. In the illustrated example, digital IF packet 671 includes a digital IF waveform contained within the signal data payload of a signal data packet 679. The digital IF waveform may represent the modulated form of one or more baseband frames 678 (or portions of one or more baseband frames 678), such that the baseband frames may be recovered by demodulating the digital IF waveform contained within the signal data payload. Signal data packet 679 may also include a signal packet header, which may implement the VITA standard (e.g., VITA 49.2 specification) or another standard.

In some examples, signal data packet 679 is encapsulated within a UDP packet 677 having a UDP header and UDP payload. UDP packet 677 may be encapsulated within an IP packet 675 having an IP header and IP payload, which may be encapsulated within an Ethernet packet 673 having an Ethernet frame header and Ethernet frame payload. In some examples, the total Ethernet packet size varies based on the number and size of the data samples in the signal data payload of signal data packet 679. There may be a fixed overhead within the Ethernet frame which comprises the IP header (20 octets for IPV4 or 40 octets (minimum) for IPV6), the UDP header (8 octets), the signal packet header (28 octets). In some examples, the Ethernet frame payload is adjustable from 128 octets to approximately 9000 octets.

In some examples, digital IF packet 671 may include different packet classes for signal data packet 679. In a first packet class, signal data packet 679 may be a regular data packet that includes the data for the digital samples forming the digital IF waveform. In a second packet class, signal data packet 679 may be a context packet that includes data to ensure standardization of the transport of metadata describing the sampled signal data. Such data may include the IF reference frequency, the sample rate, the bit depth, the equivalent analog bandwidth of the signal represented by the digital stream, the frequency offset of the center of the band occupied by the signal from the IF reference frequency, among other possibilities. In a third packet class, signal data packet 679 may be a command packet that includes data used to provide and acknowledge device settings and support control of timing to permit synchronization of upstream or downstream devices.

Figures 7A, 7B, 7C:
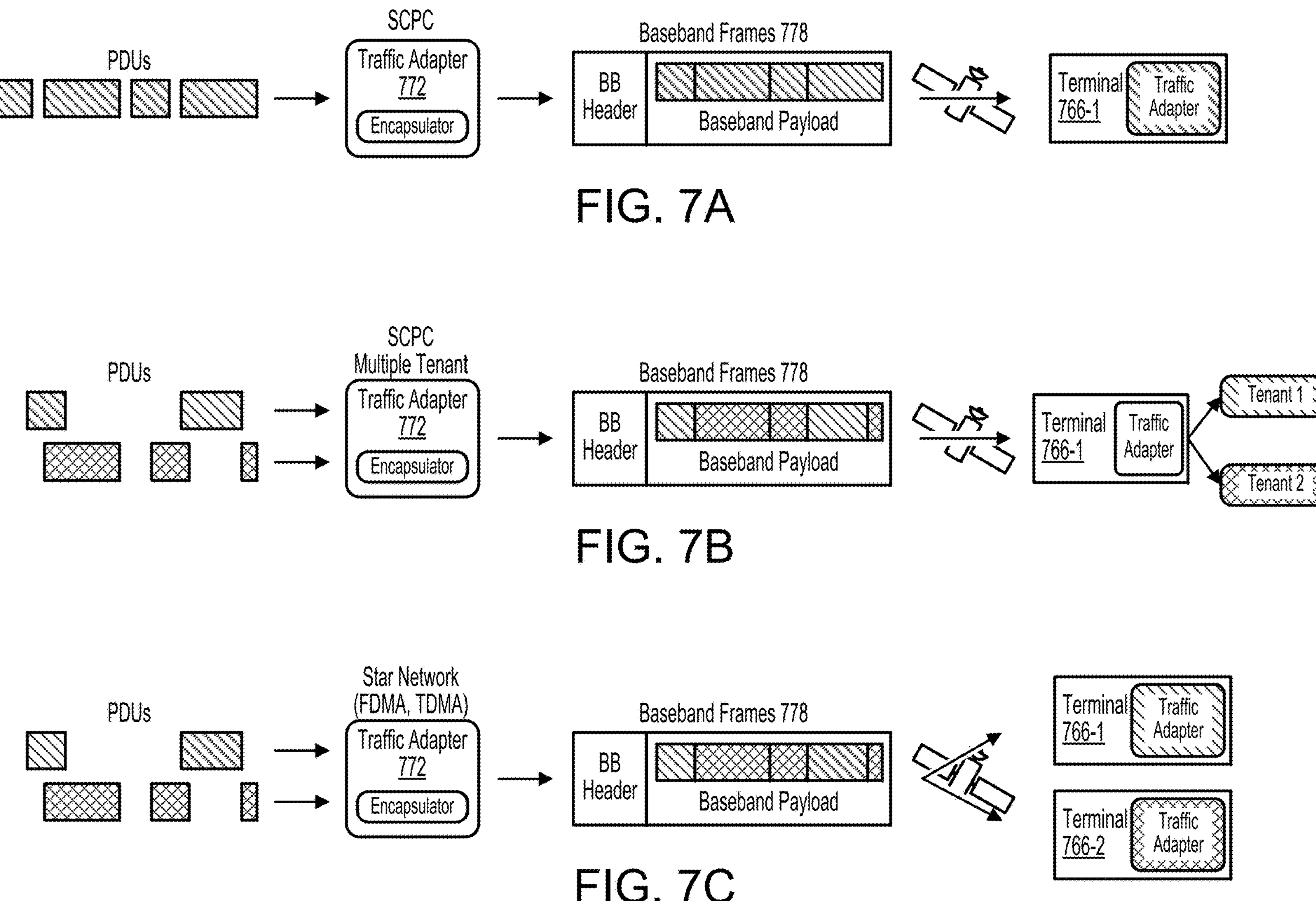
FIGS. 7A-7C illustrate example traffic adapters implementing different network types.

FIGS. 7A-7C illustrate example traffic adapters 772 implementing different network types, in accordance with some embodiments of the present disclosure. In FIG. 7A, traffic adapter 772 is configured by the management system to implement a SCPC (single tenant) network connection type. The encapsulator processes incoming PDUs destined for a terminal 766-1 by encapsulating the PDUs into a baseband frame 778 and adding an encapsulation header to each PDU and a baseband header to the entire baseband frame 778. The encapsulation headers (based on ETSI TS 102 606) include an identifier for terminal 766-1, an identifier of the encapsulated PDU's type, and an indicator of the length of the PDU. They may further include information to allow splitting an encapsulated PDU into multiple fragments to be distributed over multiple baseband frames 778. The baseband header includes, among other elements, information about the contained encapsulation structure and the total size of the payload. Upon receiving baseband frame 778, a traffic adapter of terminal 766-1 may decapsulate the baseband frame to recover the PDUs.

In FIG. 7B, traffic adapter 772 is configured by the management system to implement a SCPC (multiple tenant) network connection type. The encapsulator processes a first set of PDUs destined for Tenant 1 via terminal 766-1 and a second set of PDUs destined for Tenant 2 via terminal 766-1 by encapsulating both sets of PDUs (received within a particular time window) into a single baseband frame 778 and adding a baseband header to baseband frame 778 and individual encapsulation headers to each PDU. The encapsulation headers may include an identifier for Tenant 1, an identifier for Tenant 2, an indicator of the encapsulated PDU's content, an indicator of the size of the encapsulated PDU, and information about fragmentation of the encapsulated PDU across multiple baseband frames 778, among other possibilities. The baseband header includes, among other elements, information about the contained encapsulation structure and the total size of the payload. Upon receiving baseband frame 778, the traffic adapter of terminal 766-1 may decapsulate baseband frame 778 to recover and separate the PDUs, and may route the PDUstoward Tenant 1 and Tenant 2 as appropriate.

In FIG. 7C, traffic adapter 772 is configured by the management system to implement an FDMA or TDMA network connection type. The encapsulator processes a first set of PDUs destined for terminal 766-1 and a second set of PDUsdestined for terminal 766-2 by encapsulating both sets of PDUs (received within a particular time window) into a single baseband frame 778 and adding a baseband header to baseband frame 778 and individual encapsulation headers to each PDU. The encapsulation headers include an identifier for terminal 366-1, an identifier for terminal 366-2, an indicator of the encapsulated PDU's content, an indicator of the size of the encapsulated PDU, and information about fragmentation of the encapsulated PDU across multiple baseband frames 778, among other possibilities. They may further include information to allow splitting an encapsulated PDU into multiple fragments to be distributed over multiple baseband frames 778. The baseband header includes, among other elements, information about the contained encapsulation structure and the total size of the payload. Upon receiving baseband frame 778, the traffic adapter of terminal 766-1 may decapsulate baseband frame 778 to recover the PDUs destined for terminal 766-1, and the traffic adapter of terminal 766-2 may decapsulate baseband frame 778 to recover the PDUs destined for terminal 766-2.

Figure 8:
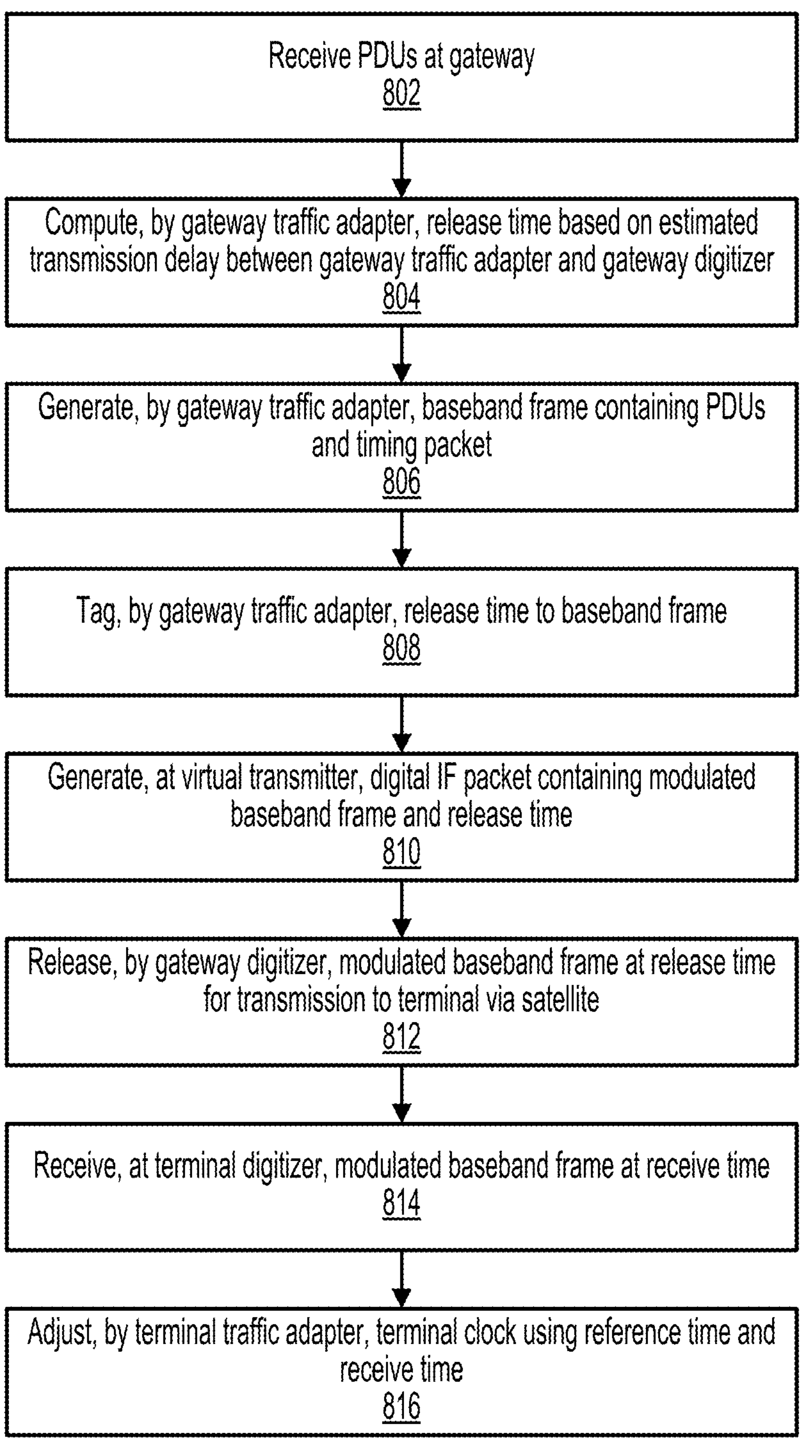
FIG. 8 illustrates a method of handling timing in a satellite communication system.

FIG. 8 illustrates a method 800 of handling timing in a satellite communication system, in accordance with some embodiments of the present disclosure. Steps of method 800 may be performed in any order and/or in parallel, and one or more steps of method 800 may be optionally performed. One or more steps of method 800 may be performed by one or more processors. Method 800 may be implemented as a computer-readable medium or computer program product comprising instructions which, when the program is executed by one or more processors, cause the one or more processors to carry out the steps of method 800.

At step 802, PDUs (e.g., PDUs 211) are received at a gateway (e.g., gateways 138, 238, 438, 538) of a satellite communication system (e.g., satellite communication systems 100, 200, 400, 500). The PDUs are to be transmitted to a terminal (e.g., terminals 166, 266, 366, 466, 566, 766) via a satellite (e.g., satellites 120, 220, 320, 420, 520).

At step 804, a release time (e.g., release times 103, 203) at which a baseband frame (e.g., baseband frames 278A, 578, 778) containing the PDUs is to be released from a digitizer (e.g., digitizers 140A, 240A, 440A, 540) of the gateway is computed. The release time may be computed by a traffic adapter (e.g., traffic adapter 172A, 272A, 572, 772) of the gateway. The release time may be computed based on a transmission and processing delay between the traffic adapter of the gateway and the digitizer of the gateway (e.g., traffic adapter-to-digitizer delay $D_{TD}$). The release time may be computed based on a gateway clock (e.g., gateway clocks 194, 294).

At step 806, the baseband frame containing the PDUs and a timing packet (e.g., timing packets 213, 313) is generated. The baseband frame may be generated by the traffic adapter of the gateway. The timing packet may include a reference time (e.g., reference times 105, 205, 305) for use at the terminal for synchronizing a terminal clock (e.g., terminal clocks 196, 296, 396) with the gateway clock. The reference time may be computed based on the release time and a transmission and processing delay between the digitizer of the gateway and the satellite (e.g., digitizer-to-satellite delay $D_{DS}$).

At step 808, the release time is tagged to the baseband frame to produce a tagged baseband frame. The release time may be tagged to the baseband frame by the traffic adapter of the gateway. The tagged baseband frame may be sent from the traffic adapter of the gateway to a virtual transmitter (e.g., virtual transmitters 174, 274, 574) of the gateway.

At step 810, a digital IF packet (e.g., digital IF packets 271A, 571, 671) containing a modulated baseband frame and the release time is generated. The digital IF packet may be generated by the virtual transmitter. The digital IF packet may be generated by modulating the baseband frame and inserting the release time from the tagged baseband frame into a header of the digital IF packet. The digital IF packet may be sent from the virtual transmitter to the digitizer of the gateway.

At step 812, the modulated baseband frame may be released at the release time for transmission to the terminal via the satellite. The modulated baseband frame may be released by the digitizer of the gateway.

At step 814, the modulated baseband frame may be received at the terminal at a receive time (e.g., receive times 107, 207, 307). The modulated baseband frame may be received at a digitizer (e.g., digitizers 140B, 240B, 340B, 440B, 540) of the terminal. The receive time may be recorded based on the terminal clock. The digitizer of the terminal may generate a second digital IF packet (e.g., digital IF packets 271B, 371B, 571, 671) containing the modulated baseband frame and the receive time. The second digital IF packet may be sent from the digitizer of the terminal to a virtual receiver (e.g., virtual receivers 176, 276, 376, 576) of the terminal. The virtual receiver may demodulate the modulated baseband frame to obtain the baseband frame. The virtual receiver may tag the receiver time to the baseband frame to produce a second tagged baseband frame. The second tagged baseband frame may be sent from the virtual receiver to a traffic adapter (e.g., traffic adapter 172B, 272B, 372B, 572, 772) of the terminal.

At step 816, the terminal clock may be adjusted using the reference time and the receive time. The terminal clock may be adjusted by the traffic adapter of the terminal. The traffic adapter may read the reference time and the receive time from the second tagged baseband frame and adjust the terminal clock based on a comparison using the reference time, the receive time, and a transmission and processing delay between the satellite and the digitizer of the terminal (e.g., satellite-to-digitizer delay $D_{SD}$).

Figure 9:
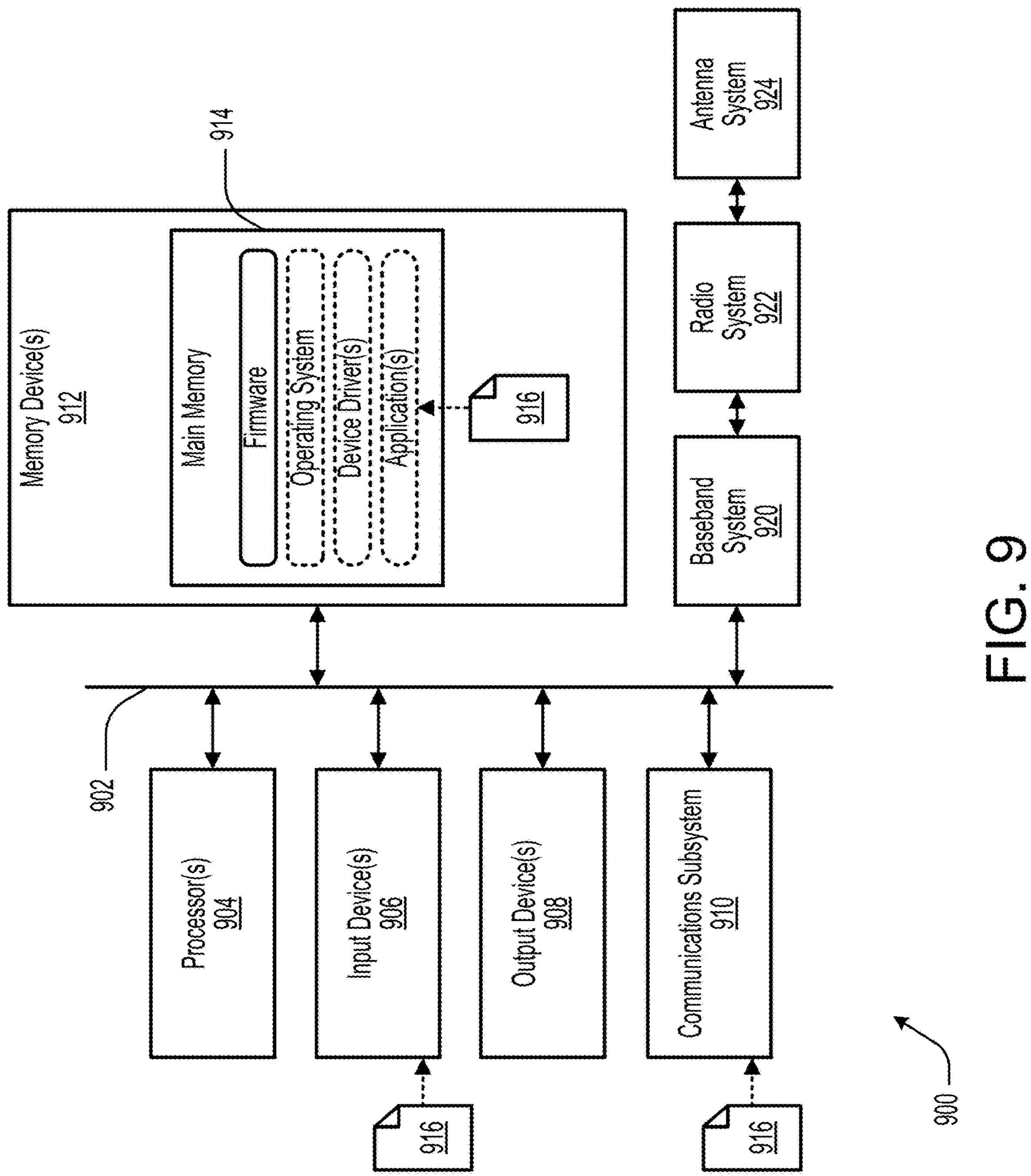
FIG. 9 illustrates an example computer system comprising various hardware elements.

FIG. 9 illustrates an example computer system 900 comprising various hardware elements, in accordance with some embodiments of the present disclosure. Computer system 900 may be incorporated into or integrated with devices described herein and/or may be configured to perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

In the illustrated example, computer system 900 includes a communication medium 902, one or more processor(s) 904, one or more input device(s) 906, one or more output device(s) 908, a communications subsystem 910, one or more memory device(s) 912, a baseband system 920, a radio system 922, and an antenna system 924. Computer system 900 may be implemented using various hardware implementations and embedded system technologies. For example, one or more elements of computer system 900 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 900 may be communicatively coupled via communication medium 902. While communication medium 902 is illustrated as a single connection for purposes of clarity, it should be understood that communication medium 902 may include various numbers and types of communication media for transferring data between hardware elements. For example, communication medium 902 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 902 may include one or more buses that connect the pins of the hardware elements of computer system 900. For example, communication medium 902 may include a bus that connects processor(s) 904 with main memory 914, referred to as a system bus, and a bus that connects main memory 914 with input device(s) 906 or output device(s) 908, referred to as an expansion bus. The system bus may itself consist of several buses, including an address bus, a data bus, and a control bus. The address bus may carry a memory address from processor(s) 904 to the address bus circuitry associated with main memory 914 in order for the data bus to access and carry the data contained at the memory address back to processor(s) 904. The control bus may carry commands from processor(s) 904 and return status signals from main memory 914. Each bus may include multiple wires for carrying multiple bits of information and each bus may support serial or parallel transmission of data.

Processor(s) 904 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 904 may include one or more multi-core processors, in which each core may read and execute program instructions concurrently with the other cores, increasing speed for programs that support multithreading.

Input device(s) 906 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 906 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 908 may include one or more of various devices that convert information into human-readable form, such as without limitation a display device, a speaker, a printer, a haptic or tactile device, and/or the like. Output device(s) 908 may also include devices for writing to removable storage devices or other removable media, such as those described in reference to input device(s) 906. Output device(s) 908 may also include various actuators for causing physical movement of one or more components. Such actuators may be hydraulic, pneumatic, electric, and may be controlled using control signals generated by computer system 900.

Communications subsystem 910 may include hardware components for connecting computer system 900 to systems or devices that are located external to computer system 900, such as over a computer network. In various embodiments, communications subsystem 910 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 912 may include the various data storage devices of computer system 900. For example, memory device(s) 912 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 904 and memory device(s) 912 are illustrated as being separate elements, it should be understood that processor(s) 904 may include varying levels of on-processor memory, such as processor registers and caches that may be utilized by a single processor or shared between multiple processors.

Memory device(s) 912 may include main memory 914, which may be directly accessible by processor(s) 904 via the address and data buses of communication medium 902.

For example, processor(s) 904 may continuously read and execute instructions stored in main memory 914. As such, various software elements may be loaded into main memory 914 to be read and executed by processor(s) 904 as illustrated in FIG. 9. Typically, main memory 914 is volatile memory, which loses all data when power is turned off and accordingly needs power to preserve stored data. Main memory 914 may further include a small portion of non-volatile memory containing software (e.g., firmware, such as BIOS) that is used for reading other software stored in memory device(s) 912 into main memory 914. In some embodiments, the volatile memory of main memory 914 is implemented as RAM, such as dynamic random-access memory (DRAM), and the non-volatile memory of main memory 914 is implemented as read-only memory (ROM), such as flash memory, erasable programmable read-only memory (EPROM), or electrically erasable programmable read-only memory (EEPROM).

Computer system 900 may include software elements, shown as being currently located within main memory 914, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 916, which are executable by computer system 900. In one example, such instructions 916 may be received by computer system 900 using communications subsystem 910 (e.g., via a wireless or wired signal that carries instructions 916), carried by communication medium 902 to memory device(s) 912, stored within memory device(s) 912, read into main memory 914, and executed by processor(s) 904 to perform one or more steps of the described methods. In another example, instructions 916 may be received by computer system 900 using input device(s) 906 (e.g., via a reader for removable media), carried by communication medium 902 to memory device(s) 912, stored within memory device(s) 912, read into main memory 914, and executed by processor(s) 904 to perform one or more steps of the described methods.

Computer system 900 may include optional wireless communication components that facilitate wireless communication over a voice network and/or a data network. The wireless communication components comprise an antenna system 924, a radio system 922, and a baseband system 920. In computer system 900, RF signals are transmitted and received over the air by antenna system 924 under the management of radio system 922. In an embodiment, antenna system 924 may comprise one or more antennae and one or more multiplexors (not shown) that perform a switching function to provide antenna system 924 with transmit and receive signal paths. In the reception path, received RF signals can be coupled from a multiplexor to a low noise amplifier (not shown) that amplifies the received RF signal and sends the amplified signal to radio system 922. In an alternative embodiment, radio system 922 may comprise one or more radios that are configured to communicate over various frequencies. In an embodiment, radio system 922 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 922 to baseband system 920.

In some embodiments of the present disclosure, instructions 916 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 900. For example, the non-transitory computer-readable medium may be one of memory device(s) 912 (as shown in FIG. 9). In some cases, the non-transitory computer-readable medium may be separate from computer system 900. In one example, the non-transitory computer-readable medium may be a removable medium provided to input device(s) 906 (as shown in FIG. 9), such as those described in reference to input device(s) 906, with instructions 916 being read into computer system 900 by input device(s) 906. In another example, the non-transitory computer-readable medium may be a component of a remote electronic device, such as a mobile phone, that may wirelessly transmit a data signal that carries instructions 916 to computer system 900 and that is received by communications subsystem 910 (as shown in FIG. 9).

Instructions 916 may take any suitable form to be read and/or executed by computer system 900. For example, instructions 916 may be source code (written in a human-readable programming language such as Java, C, C++, C#, Python), object code, assembly language, machine code, microcode, executable code, and/or the like. In one example, instructions 916 are provided to computer system 900 in the form of source code, and a compiler is used to translate instructions 916 from source code to machine code, which may then be read into main memory 914 for execution by processor(s) 904. As another example, instructions 916 are provided to computer system 900 in the form of an executable file with machine code that may immediately be read into main memory 914 for execution by processor(s) 904. In various examples, instructions 916 may be provided to computer system 900 in encrypted or unencrypted form, compressed or uncompressed form, as an installation package or an initialization for a broader software deployment, among other possibilities.

In one aspect of the present disclosure, a system (e.g., computer system 900) is provided to perform methods in accordance with various embodiments of the present disclosure. For example, some embodiments may include a system comprising one or more processors (e.g., processor(s) 904) that are communicatively coupled to a non-transitory computer-readable medium (e.g., memory device(s) 912 or main memory 914). The non-transitory computer-readable medium may have instructions (e.g., instructions 916) stored therein that, when executed by the one or more processors, cause the one or more processors to perform the methods described in the various embodiments.

In another aspect of the present disclosure, a computer-program product that includes instructions (e.g., instructions 916) is provided to perform methods in accordance with various embodiments of the present disclosure. The computer-program product may be tangibly embodied in a non-transitory computer-readable medium (e.g., memory device(s) 912 or main memory 914). The instructions may be configured to cause one or more processors (e.g., processor(s) 904) to perform the methods described in the various embodiments.

In another aspect of the present disclosure, a non-transitory computer-readable medium (e.g., memory device(s) 912 or main memory 914) is provided. The non-transitory computer-readable medium may have instructions (e.g., instructions 916) stored therein that, when executed by one or more processors (e.g., processor(s) 904), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms “a”, “an”, and “the” include plural references unless the context clearly dictates otherwise. Thus, for example, reference to “a user” includes reference to one or more of such users, and reference to “a processor” includes reference to one or more processors and equivalents thereof known to those skilled in the art, and so forth.

Also, the words “comprise,” “comprising,” “contains,” “containing,” “include,” “including,” and “includes,” when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of handling timing in a satellite communication system having a gateway and a terminal, the method comprising:

receiving, at the gateway, protocol data units (PDUs) to be transmitted to the terminal via a satellite;

computing, by a traffic adapter of the gateway, a release time at which a baseband frame containing the PDUs is to be released from a digitizer of the gateway for transmission to the terminal via the satellite, the release time being computed based on a transmission and processing delay between the traffic adapter of the gateway and the digitizer of the gateway;

generating, by the traffic adapter of the gateway, the baseband frame containing the PDUs and a timing packet, the timing packet including a reference time for use at the terminal for synchronizing a terminal clock with a gateway clock;

tagging, by the traffic adapter of the gateway, the release time to the baseband frame to produce a tagged baseband frame;

generating a digital intermediate frequency (IF) packet containing a modulated baseband frame and the release time by:

modulating the baseband frame; and inserting the release time from the tagged baseband frame into a header of the digital IF packet; and releasing, by the digitizer of the gateway, the modulated baseband frame at the release time for transmission to the terminal via the satellite.

2. The method of claim 1, wherein the digital IF packet is generated by a virtual transmitter of the gateway, and wherein the method further comprises:

sending the tagged baseband frame from the traffic adapter of the gateway to the virtual transmitter; and sending the digital IF packet from the virtual transmitter to the digitizer of the gateway.

3. The method of claim 1, further comprising:

receiving, at a digitizer of the terminal, the modulated baseband frame at a receive time; and generating, by the digitizer of the terminal, a second digital IF packet containing the modulated baseband frame and the receive time, the receive time to be used at the terminal for synchronizing the terminal clock with the gateway clock.

4. The method of claim 3, wherein the release time and the reference time are computed based on the gateway clock and the receive time is recorded based on the terminal clock.

5. The method of claim 3, further comprising:

sending the second digital IF packet from the digitizer of the terminal to a virtual receiver of the terminal;

demodulating, by the virtual receiver, the modulated baseband frame to obtain the baseband frame; and tagging, by the virtual receiver, the receiver time to the baseband frame to produce a second tagged baseband frame.

6. The method of claim 5, further comprising:

sending the second tagged baseband frame from the virtual receiver to a traffic adapter of the terminal;

reading, by the traffic adapter, the reference time and the receive time from the second tagged baseband frame; and adjusting, by the traffic adapter, the terminal clock based on a comparison using the reference time and the receive time.

7. The method of claim 1, wherein the reference time is an estimated time at which the baseband frame is processed by the satellite, and wherein the reference time is computed based on the release time and a transmission and processing delay between the digitizer of the gateway and the satellite.

8. The method of claim 1, wherein the traffic adapter of the gateway is running at a compute infrastructure of the gateway.

9. A non-transitory computer-readable medium comprising instructions that, when executed by one or more processors, cause the one or more processors to perform operations comprising:

receiving, at a gateway, protocol data units (PDUs) to be transmitted to a terminal via a satellite;

computing, by a traffic adapter of the gateway, a release time at which a baseband frame containing the PDUs is to be released from a digitizer of the gateway for transmission to the terminal via the satellite, the release time being computed based on a transmission and processing delay between the traffic adapter of the gateway and the digitizer of the gateway;

generating, by the traffic adapter of the gateway, the baseband frame containing the PDUs and a timing packet, the timing packet including a reference time for use at the terminal for synchronizing a terminal clock with a gateway clock;

tagging, by the traffic adapter of the gateway, the release time to the baseband frame to produce a tagged baseband frame;

generating a digital intermediate frequency (IF) packet containing a modulated baseband frame and the release time by:

modulating the baseband frame; and inserting the release time from the tagged baseband frame into a header of the digital IF packet; and releasing, by the digitizer of the gateway, the modulated baseband frame at the release time for transmission to the terminal via the satellite.

10. The non-transitory computer-readable medium of claim 9, wherein the digital IF packet is generated by a virtual transmitter of the gateway, and wherein the operations further comprise:

sending the tagged baseband frame from the traffic adapter of the gateway to the virtual transmitter; and sending the digital IF packet from the virtual transmitter to the digitizer of the gateway.

11. The non-transitory computer-readable medium of claim 9, wherein the operations further comprise:

receiving, at a digitizer of the terminal, the modulated baseband frame at a receive time; and generating, by the digitizer of the terminal, a second digital IF packet containing the modulated baseband frame and the receive time, the receive time to be used at the terminal for synchronizing the terminal clock with the gateway clock.

12. The non-transitory computer-readable medium of claim 11, wherein the release time and the reference time are computed based on the gateway clock and the receive time is recorded based on the terminal clock.

13. The non-transitory computer-readable medium of claim 11, wherein the operations further comprise:

sending the second digital IF packet from the digitizer of the terminal to a virtual receiver of the terminal;

demodulating, by the virtual receiver, the modulated baseband frame to obtain the baseband frame; and tagging, by the virtual receiver, the receiver time to the baseband frame to produce a second tagged baseband frame.

14. The non-transitory computer-readable medium of claim 13, wherein the operations further comprise:

sending the second tagged baseband frame from the virtual receiver to a traffic adapter of the terminal;

reading, by the traffic adapter, the reference time and the receive time from the second tagged baseband frame; and adjusting, by the traffic adapter, the terminal clock based on a comparison using the reference time and the receive time.

15. The non-transitory computer-readable medium of claim 9, wherein the reference time is an estimated time at which the baseband frame is processed by the satellite, and wherein the reference time is computed based on the release time and a transmission and processing delay between the digitizer of the gateway and the satellite.

16. The non-transitory computer-readable medium of claim 9, wherein the traffic adapter of the gateway is running at a compute infrastructure of the gateway.

17. A system comprising:

one or more processors; and a non-transitory computer-readable medium comprising instructions that, when executed by the one or more processors, cause the one or more processors to:

receive, at a gateway, protocol data units (PDUs) to be transmitted to a terminal via a satellite;

compute, by a traffic adapter of the gateway, a release time at which a baseband frame containing the PDUs is to be released from a digitizer of the gateway for transmission to the terminal via the satellite, the release time being computed based on a transmission and processing delay between the traffic adapter of the gateway and the digitizer of the gateway;

generate, by the traffic adapter of the gateway, the baseband frame containing the PDUs and a timing packet, the timing packet including a reference time for use at the terminal for synchronizing a terminal clock with a gateway clock;

tag, by the traffic adapter of the gateway, the release time to the baseband frame to produce a tagged baseband frame;

generate a digital intermediate frequency (IF) packet containing a modulated baseband frame and the release time by modulating the baseband frame and inserting the release time from the tagged baseband frame into a header of the digital IF packet; and release, by the digitizer of the gateway, the modulated baseband frame at the release time for transmission to the terminal via the satellite.

18. The system of claim 17, wherein the digital IF packet is generated by a virtual transmitter of the gateway, and wherein the one or more processors are further configured to:

send the tagged baseband frame from the traffic adapter of the gateway to the virtual transmitter; and send the digital IF packet from the virtual transmitter to the digitizer of the gateway.

19. The system of claim 17, wherein the one or more processors are further configured to:

receive, at a digitizer of the terminal, the modulated baseband frame at a receive time; and generate, by the digitizer of the terminal, a second digital IF packet containing the modulated baseband frame and the receive time, the receive time to be used at the terminal for synchronizing the terminal clock with the gateway clock.

20. The system of claim 19, wherein the release time and the reference time are computed based on the gateway clock and the receive time is recorded based on the terminal clock.

* * * * *